UNITED STATES PATENT OFFICE.

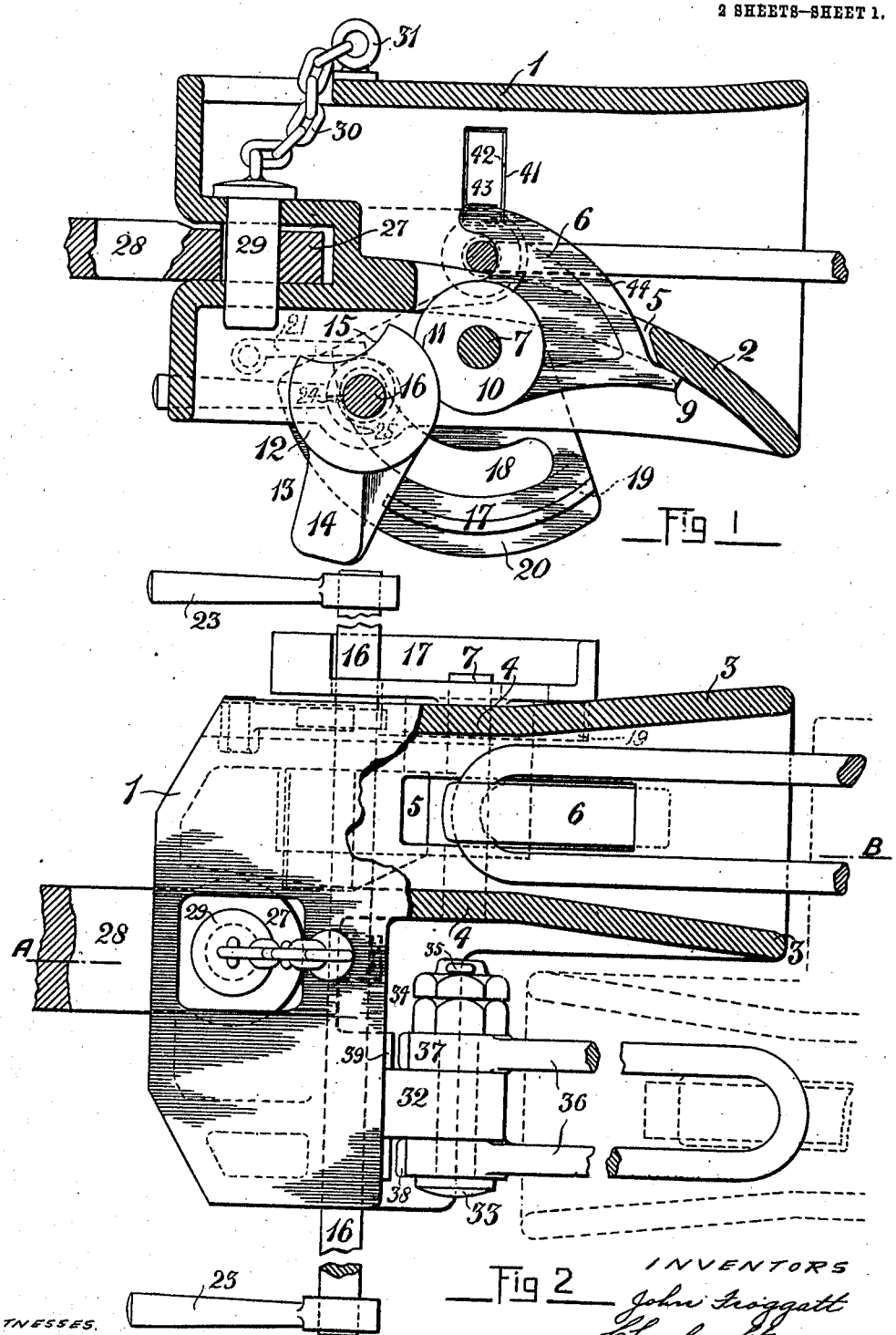

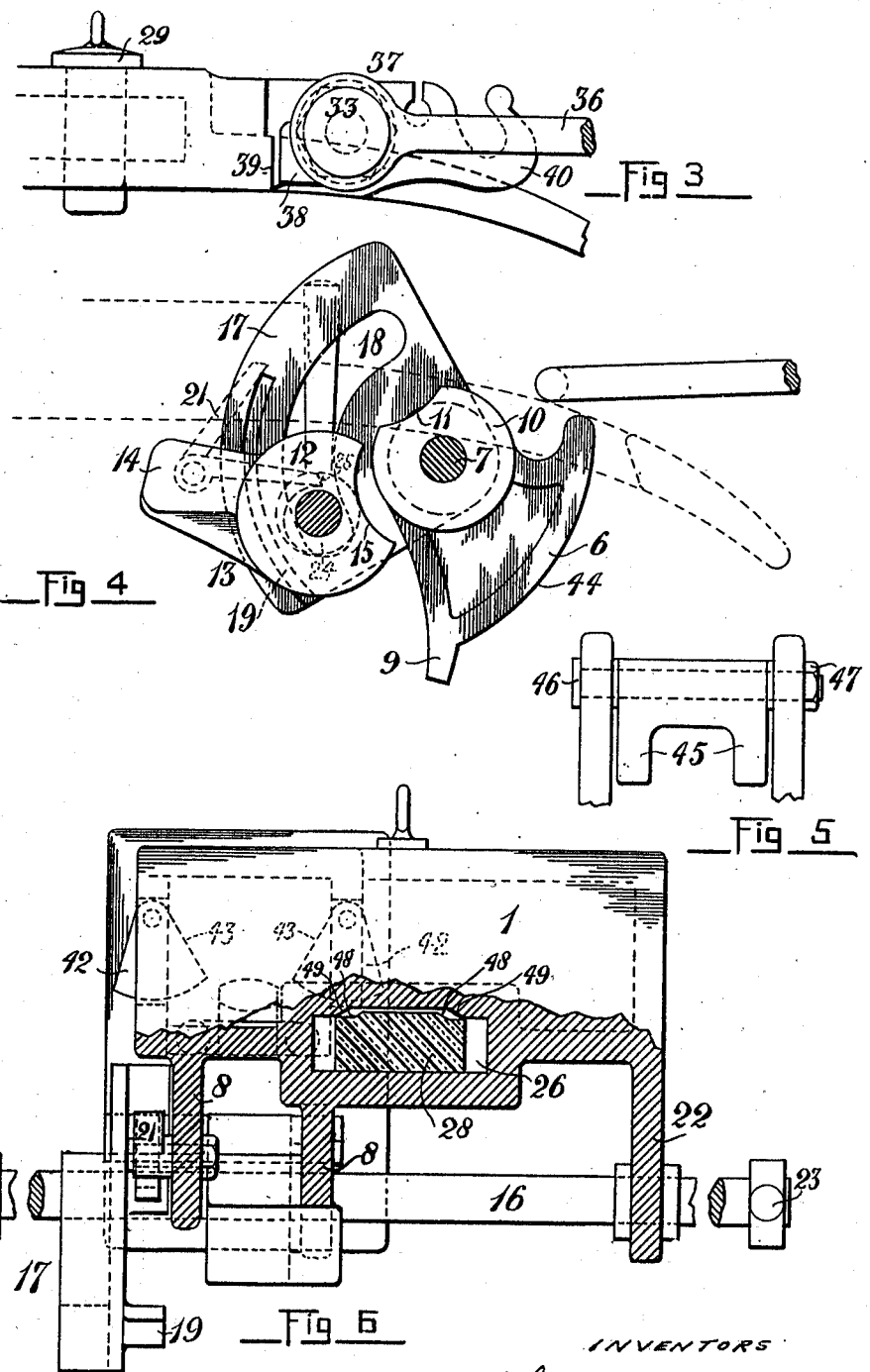

JOHN FROGGATT, OF CAMBERWELL, AND CHARLES STACEY, OF MALVERN, VICTORIA, AUSTRALIA.

COUPLING.

974,254. Specification of Letters Patent. Patented Nov. 1, 1910.

Application filed March 21, 1908. Serial No. 422,386.

*To all whom it may concern:*

Be it known that we, JOHN FROGGATT, a British subject, and resident of 40 St. Johns avenue, Camberwell, and CHARLES STACEY, a British subject, and resident of Cressy street, Malvern, both in the State of Victoria, Commonwealth of Australia, have invented certain new and useful Improvements in Couplings, of which the following is a specification.

This invention relates to an improved means for coupling and uncoupling bodies, and the same or modifications thereof is or are applicable to various structures.

For convenience, without limitation thereto, this invention will be described as applied to railway rolling stock, the connection between units being made automatically but broken by an attendant from any convenient position, without incurring risk or danger.

A particular feature of this invention is the locking device employed, in which an oscillatory engaging piece (such as a hook) includes or presents a portion arranged to receive or couple an opposing device (such as a link) and an oscillatory locking body in juxtaposition to said engaging piece, the hub or other part of the one presenting a portion or contour such as a concave to the hub or other convex part of the other, or vice versa, in such a manner as to be engaged by or engage with and interlock each other, and be unlocked at will.

In order that this invention may be fully understood reference is made to the accompanying sheets of drawings wherein like numerals denote like parts.

Figure 1, sectional elevation of the invention taken upon a broken line A—B of Fig. 2. Fig. 2, plan of same omitting auxiliary draw hook shown in Fig. 3, and indicating in dotted lines an approaching coupling counterpart. Fig. 3, part elevation showing coupling link and auxiliary draw hook. Fig. 4, side elevation of certain operative parts of the coupling in the unlocked position. Fig. 5 is a plan view of a modification. Fig. 6, back elevation, partly in section, of the coupling.

In the accompanying drawings, 1 is the casing embracing an inclined plate 2 located between two sides or cheeks 3 set at an angle or splayed to provide a converging channel to direct a link or other structure designed to couple with a hook or engaging piece. Said cheeks having two parallel extensions 4. A slot 5 is formed in the inclined plate 2 within which an engaging piece or draw hook 6 is arranged to oscillate. Beneath the inclined plate 2 a horizontal shaft 7 is mounted between depending ribs 8—8 (Fig. 6) of the casing 1 and upon said shaft 7 and rigidly connected thereto is the draw hook 6 formed with an extension or stop 9. The shaft 7 also carries a hook overbalancing weight 17 conveniently quadrant shaped, formed with a radial slot 18 to allow of the operating shaft 16 passing therethrough. The draw hook is provided with a hub or body 10 formed with a concave or equivalent surface 11 designed to receive or interlock and co-act with a convex surface such as 15 of the hub or body 12 of a locking piece 13 provided with a weight 14, the locking piece being carried by the operating shaft 16.

Projecting from the inner face 20 of the weight 17 is a rib 19 which engages with a pawl 21 hereinafter referred to. This weight is provided to overbalance the draw hook 6 and as soon as an opposing link is freed therefrom return said hook into the locking position ready for reëngagement. The hub or body 12 of the locking piece 13 when in the position shown in Fig. 1 constitutes a lock for, and effectually prevents any alteration in the position as shown in Fig. 1 of the hook 6 until the operating shaft 16 is partially rotated, which action frees the concave 11 of hub 10 from contact with the convex portion of hub 12 and causes the parts to assume the position shown in Fig. 4. The shaft 16 carrying the locking piece 13 is mounted in suitable bearings in the side 22 and rib 8 of the casing 1. This shaft extends or is carried to any convenient length or position on the rolling stock or other structure for operation and upon the outer ends of same are secured the operating handles 23. Upon said shaft 16 is mounted a disk 24 having a shoulder 25 arranged to engage with the before mentioned pawl 21. The casing 1 is provided with a chamber 26 to receive the eye 27 of a draw bar 28 secured by a pin 29 flexibly attached to the casing 1 by chain 30 and eye-bolt 31.

A projection 32 receives a bolt 33 secured by nuts 34 and split pin 35. This bolt passes through the eyes of link 36 arranged to confront a draw hook similar to that described on an approaching coupling counterpart from the casing of which a similar and corresponding link extends to confront and engage with the draw hook 6 before described. The eyes 37 of the link 36 are each formed with a square shoulder 38 which contacts with a shoulder or flat 39 of the casing 1, thus preventing the link 36 dropping into an inoperative position relatively to an approaching coupling counterpart. Centrally an auxiliary draw hook 40, Fig. 3, (for sake of clearness omitted from Fig. 2) extends from the casing 1 to receive the link of an ordinary screw or other coupling on another vehicle should such vehicle not be fitted with the herein described coupling.

Referring to Fig. 6, in which a link retaining device is shown:—Pivotally mounted in slots 41 formed in the two parallel extensions 4—4 are a pair of pawls 42 so weighted that when in their normal position they project into the open space between said parallel extensions, and having a tendency to approach each other. These pawls 42 are disposed relatively to the draw hook so that an approaching link riding up the face 44 of the draw hook 6 contacts with the faces 43—43 of said pawls, and forcing them outward drops into engagement with the draw hook 6. The pawls 42 then assume their normal position and prevent the link jumping out of engagement with the draw hook, as shown by dotted lines in Fig. 6. An alternative form of link retaining device is shown in Fig. 5. In this figure the parallel extensions 4—4 carry a loose piece 45 pivotally mounted to swing in one direction on pin 46 which is secured by nut 47. In Fig. 6 a means of bringing the coupling into a central position relatively to the draw bar 28 is shown, and consists in providing the draw bar with inclines 48—48 which by riding down or over corresponding inclines 49—49 in the chamber 26 centralizes the draw bar and coupling.

Assuming the parts as in the position shown in Figs. 1 and 2:—As a coupling approaches its counterpart on a vehicle, the link 36 rides up the plate 2, is directed laterally by the side plates 3 toward the face 44 of the draw hook or engaging piece 6 up which it rides, and forcing the pawls 42 outward drops into engagement with the hook. The convex portion of the locking piece 13 lying within the concave surface 11 of the draw hook hub locks the latter against movement when strain is applied to the link 36. It will be understood the foregoing operation takes place in respect of each hook and its opposing link simultaneously. To release the couplings the lever handles 23 are operated to sufficiently rotate or oscillate the locking piece 13 and move the convex surface of same out of engagement with the concave surface 11 of the hook or engaging piece 6, which action brings the concave surface 15 on hub 12 into such position as to allow the hub 10 to oscillate and the parts generally to assume the position shown in Fig. 4. In this figure it will be seen that the pawl 21 has engaged the shoulder 25 of disk 24 thus preventing the weight 14 returning the hub 12 into locking position until the rib 19 on weight 17 has contacted therewith and lifted it out of engagement with said shoulder 25. The hub 12 is then free to be returned to its normal or locking position by weight 14. It will also be seen from Fig. 4, that the hook 6 and link 36 have become disengaged. As soon as this takes place the weight 17 returns the hook 6 to its normal position when the convex surface of hub 12 will at once enter the concave 11 on hub 10 thus locking the parts in the position shown in Figs. 1 and 2.

While we have described and illustrated our invention as applied to railway rolling stock we do not confine same thereto, nor do we limit ourselves to the precise forms shown in the drawings, but may modify same without departing from the spirit of our invention.

We claim:—

1. A coupling for railway trains comprising an oscillating hook adapted to engage with a link on the second car, and two disks having convex and concave portions respectively so that the convex portion of one disk locks into the concave of the other so as to lock the hook in operative position.

2. A coupling comprising a shaft, a hook mounted thereon and adapted to engage with the coupling link of the other car, a disk on said shaft having a concave portion, a second shaft, a disk thereon having a convex portion adapted to engage with the concave portion of the other disk to prevent rotation of the hook.

3. A coupling comprising a casing, a shaft mounted on said casing, a hook mounted on said shaft adapted to engage with the coupling link of the other car, said casing having its walls inclined for directing the coupling link toward the said hook, a weight on the said shaft to hold the hook in coupling position, a disk on said shaft having a concave portion, a second shaft, a handle thereon for rotating the same, and a disk on said shaft having a convex portion adapted to engage with the concave portion of the other disk for locking the hook against movement.

4. A coupling comprising a casing having inclined interior walls and a slot in the bottom wall, a shaft mounted in the casing below the slot, a hook on said shaft projecting through the slot, said hook having a projection thereon adapted to engage with the bottom of the casing for limiting its upward movement, a weight tending to hold the hook in its coupling position, means for locking the hook in its raised position, and pivoted members in the casing for preventing upward movement of the coupling link of the other car.

5. A coupling comprising a casing, a shaft mounted therein, a hook mounted on said shaft, a weight on the shaft tending to hold the hook in its coupling position, a disk on the shaft having a concave portion, a hand operated shaft, a disk thereon having a convex portion adapted to engage with the concave portion of the other disk, a weight on said second shaft, locking means for holding the second disk out of engagement with the first disk, and a projection on the weight carried by the first shaft for disengaging said locking means to allow the parts to assume their locked coupling position.

In witness whereof we have hereunto set our hands in the presence of two witnesses dated this 17th day of February 1908.

JOHN FROGGATT.
CHARLES STACEY.

Witnesses:
DANIEL JAMES LUXTON,
LESLIE LAWTON BEAR.